United States Patent [19]

Johnston

[11] 4,384,459
[45] May 24, 1983

[54] OCEAN ENERGY AND MINING SYSTEM

[76] Inventor: Harold W. Johnston, 3014 Spearman Dr., Wichita Falls, Tex. 76305

[21] Appl. No.: 196,168

[22] Filed: Oct. 14, 1980

[51] Int. Cl.³ .............................................. F03G 7/04
[52] U.S. Cl. .................................... 60/641.7; 165/45
[58] Field of Search ............... 165/45; 60/641.6, 641.7

[56] References Cited

U.S. PATENT DOCUMENTS

3,312,054  4/1967  Anderson .............................. 60/531
4,116,009  9/1978  Daubin ............................... 60/641.7

Primary Examiner—Allen M. Ostrager
Attorney, Agent, or Firm—Stephen D. Carver

[57] ABSTRACT

A system for generating energy and extracting minerals from the ocean. The system preferably comprises an underwater chamber adapted to intake cold water at the floor of the ocean and which, for energy generating purposes performs electrolysis. The chamber communicates via a conduit system with a submerged deformable condenser disposed above it. The condenser is coupled to a mineral recovery system positioned at the surface. A pump draws cold solution from the ocean bottom through the system. The condenser includes a pair of sub-compartments disposed in heat exchange relation, and refrigerant within one of the sub-compartments is liquefied by cooler water flowing through the other sub-compartment. A separate, deformable evaporator includes an internal chamber for boiling refrigerant which is warmed by surface water pumped through an adjacent chamber. As refrigerant flows from the evaporator to the condenser a turbine is driven to generate energy. Preferably the condenser and evaporator are formed from thinwalled materials such as plastic or the like, and are located at depths such that hydrostatic pressure neutralizes refrigerant pressure. In one form of the invention separate passageways are provided throughout the condenser sub-system to segregate minerals generated by electrolysis.

48 Claims, 6 Drawing Figures

OCEAN ENERGY AND MINING SYSTEM

BACKGROUND OF THE INVENTION

The present invention relates most generally to systems adapted to generate energy and/or to liberate mineral wealth from the ocean. More particularly, the present invention is related to systems employing a refrigeration cycle utilizing ocean water temperature differentials to generate energy, and to systems for performing electrolysis at the ocean bottom to extract minerals.

In the prior art it has been suggested to generate energy utilizing differential ocean water temperatures through refrigeration systems. For example, an ocean thermal energy conversion (OTEC) system has been experimentally utilized off the coast of Hawaii. Basically the system includes a turbine which is driven to generate energy by refrigerant passing through it between an evaporator and a condenser. The condenser liquifies refrigerant as cool sea water is pumped through it from the ocean bottom. The evaporator boils refrigerant as warm sea water is pumped through it from the surface. A working fluid such as ammonia or propane, having a boiling point substantially related to ocean water temperatures, is employed as the working refrigerant. The system is described, for example, in the May 5, 1980 issue of *Chemical and Engineering News.*

Other systems have been employed for generating energy from differential ocean water temperatures. U.S. Pat. No. 3,928,145 issued to Othmer on Dec. 23, 1975 discloses very relevant technology, and discusses many relevant background points. Other U.S. patents involving related heat exchanger technology are U.S. Pat. Nos. 3,916,626 and 3,715,885. U.S. Pat. No. 4,095,118 employs solar energy and magnetohydrodynamics in combination with turbine technology to generate energy.

Other prior art United States patents broadly relevant to the present case, and disclosing magnetohydrodynamic technology, may be seen in U.S. Pat. Nos. 3,621,310; 4,140,931; 3,940,639; 3,940,640; 3,549,914; and 4,151,423. U.S. Pat. No. 4,110,630 illustrates a system for generating electricity from ocean wave power. U.S. Pat. Nos. 2,513,136 and 4,084,375 broadly illustrate the liberation of gases below a water surface through electroylsis.

The differences in temperature between the ocean surface and bottom may vary from between twenty-five to forty-five degrees fahrenheit. This temperature differential occurs across ocean depths in the order of one thousand meters.

The effectiveness of underwater refrigeration cycle power systems therefore depends upon the passage of great masses of water through the condenser and evaporator units for proper heat exchange. Accordingly, to generate cost effective amounts of energy, the structures involved must be massive and can be difficult to control and position. Therefore it is necessary to provide heat exchange structure characterized by extremely large heat exchange surface area without the inherent limitations and disadvantages of the rigid, heavy metallic configuarations characteristic of the prior art.

SUMMARY OF THE INVENTION

The present invention comprises a method and apparatus for generating energy from the ocean and for liberating mineral wealth existing in solution therein.

Accordingly, a cold water intake chamber is adapted to be disposed at the bottom of the ocean or other large body of water. Elongated conduit means connect the chamber to a condenser system disposed at an intermediate depth. The condenser comprises a pair of internal sub-compartments disposed in heat exchange relationship. Cold water is drawn from the ocean bottom through a first condenser sub-compartment for cooling and liquifying refrigerant disposed within an adjacent second subcompartment. A conduit extending to the surface terminates in a pump for drawing cold water through the condenser system.

A evaporator system spaced apart from the condenser includes first and second internal chambers disposed in heat exchange relation. Warm sea water, which may be preheated by solar energy, is pumped through the first chamber to warm and thus boil refrigerant disposed in the second evaporator chamber. High pressure gaseous refrigerant is transmitted from the evaporator through a primary turbine for generating energy. The refrigerant is liquefied in the condenser, and returned through a separate liquid passageway and an optional second turbine to the condenser for recycling. Preferably both the condenser and evaporator are formed from a lightweight deformable, waterproof material such as plastic or the like. Structural integrity is facilitated by positioning the units at a depth such that hydrostatic pressure neutralizes refrigerant pressure. With the system described, a closed cycle chlorine gas refrigerant cycle is preferable employed.

Liberation of mineral wealth is accomplished by providing the water intake chamber with an electrolysis system. A pair of electrodes may be energized by electric power provided from the surface. Minerals liberated in the process are preferably segregated as they are passed upwardly in solution by separating the entire condenser coolant pathway into two separate regions. The conduit may be divided into a pair of separate passageway pipes, and the condenser water chamber may be divided into cooperating regions. In this manner for example, subsequent commingling of halogen gases separated from metal elements such as sodium will be substantially minimized. The mineral recovery system disposed in communication with a pump near the surface of the sea may also be compartmentalized, and may communicate with the condenser passageways through a pair of conduits. All of the vertical pump conduits preferably comprise conventional firehose or the like.

Thus an object of this invention is to provide a system whereby electrolysis may be utilized to liberate ocean minerals in combination with an energy generation system.

Another object of this invention is to provide an underwater energy generation system adapted to utilize ocean water temperature differentials.

A still further object of this invention is to provide a condenser and evaporator system for use with energy generation systems of the character described which are characterized by thinwalled construction.

A similar object of this invention is to provide a mineral recovery system which employs electrolysis to liberate valuable ocean mineral wealth simultaneously with the generation of energy.

Another object is to minimize the weight and cost of evaporator and condenser structures capable of operating in conjunction with underwater energy generation systems of the type described.

Yet another object of this invention is to provide a mineral recovery system of the character described which is capable of being adjusted to yield varying mineral outputs.

These and other objects and advantages of the invention, along with features of novelty apurtenant thereto, will appear or become apparent in the course of the following descriptive sections.

BRIEF DESCRIPTION OF THE DRAWINGS

In the appended drawings, which form a part of the specification and which are to be construed in conjunction therewith, and in which like reference numerals have been employed throughout to indicate like parts in the various views.

DETAILED DESCRIPTION OF THE DRAWINGS

Figure 1:
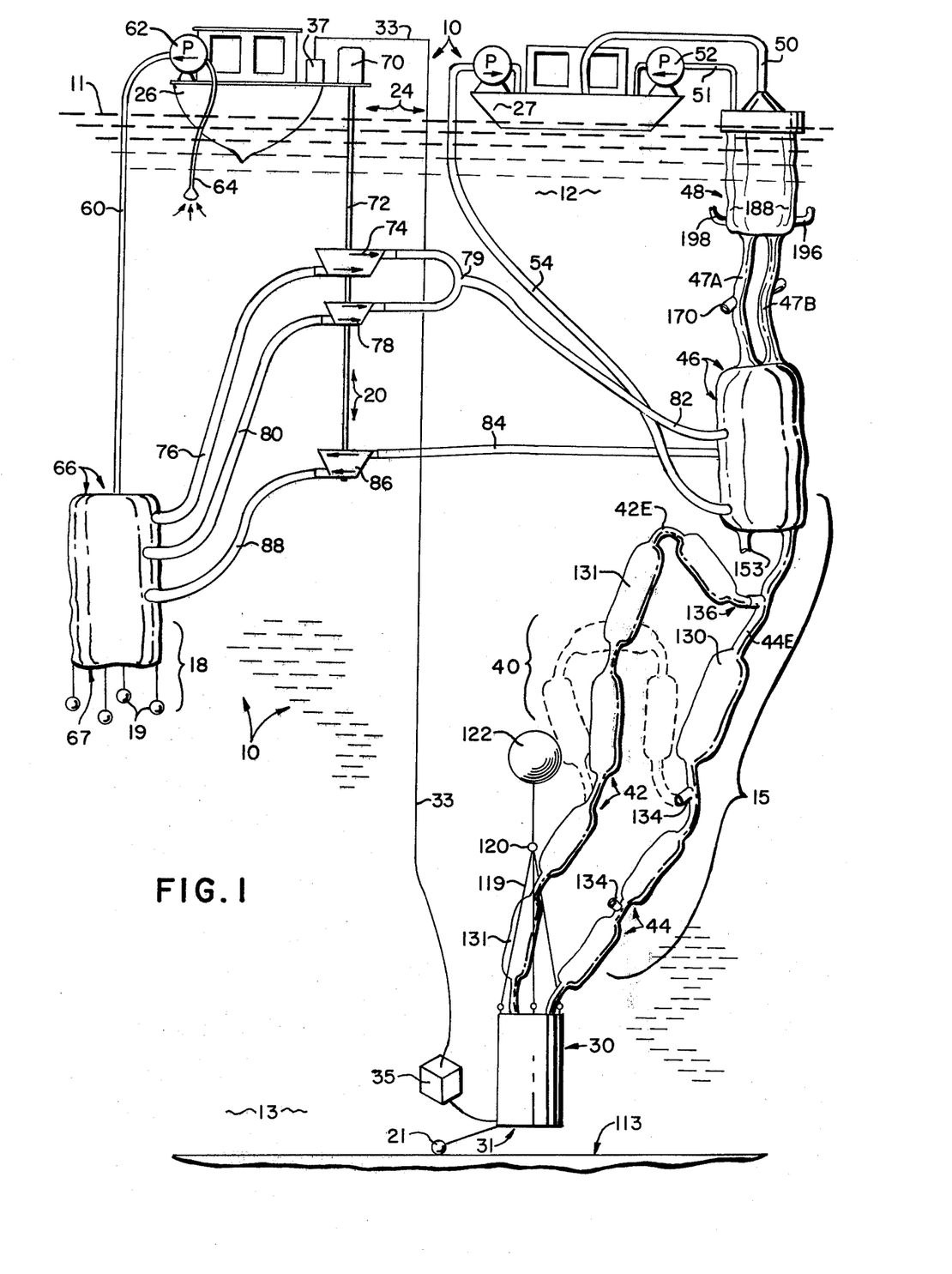
FIG. 1 is a pictorial, diagrammatic view of the system constructed in accordance with the teachings of the invention, with the scale greatly exaggerated for purposes of illustration.

With initial reference to FIG. 1, a system for generating energy from differential ocean temperature, and for generating or liberating valuable ocean mineral wealth, is generally designated by the reference numeral 10. The system 10 includes elements adapted to be disposed under water, and includes support apparatus adapted to be disposed at or near the surface 11 of the ocean 12, and apparatus adapted to be disposed at the bottom 13 thereof. System 10 is primarily adapted for use in deepwater in tropical or sub-tropical latitudes. At such regions the temperature differential between the surface 11 and the bottom 13 will vary between approximately 25 degrees to 45 degrees fahrenheit, facilitating utilization of a refrigeration cycle in which refrigerant drives a turbine system for generating energy.

System 10 comprises a condenser sub-system generally indicated by the reference numeral 15, an evaporator sub-system generally indicated by the reference numeral 18, and a turbine sub-system generally indicated by the reference numeral 20, which interconnects the evaporator sub-system with the condenser sub-system. Systems 15, 18, and 20 may be supported by an upper, floating system 24 which may comprise an elongated floating platform, a barge, or as illustrated, a pair of spaced-apart boats or vessels 26, 27. System 18 is secured by weights 19.

The condensing sub-system preferably includes an electrolysis chamber 30 which is adapted to intake relatively cold water into the system from the bottom of the ocean (or other large volume of water) in which the system 10 is disposed. Where it is desired to simultaneously generate or liberate mineral wealth, a pair of spaced apart, electrolysis electrodes 32, 34 (FIG. 3) are provided for ionizing water and the mineral salts dissolved within the water. As will later be described in conjunction with FIG. 3, an insulated, A.C. voltage conduit 33 extends downwardly to rectifier 35 from a voltage source 37 preferably supported and powered by vessel 26, resulting in D.C. energization of electrodes 32, 34.

Cold water entering chamber 30 is drawn through a conduit system 40 which, in the preferred form of the invention, comprises a pair of separate hose passageways 42, 44 formed from reinforced firehose or the like. Hoses 42, 44 extend from the upper part of the chamber 30 and communicate with a condenser 46 which is in turn connected via twin passageways 47A, 47B to an upper mineral recovery system 48. Minerals recovered within vessel 48 may be pumped into boat 27 (or other platform) via conduits 50,51 for storage. A pump 52 preferably physically located on boat or support 27 interconnects with condenser 46 via hose 54 for drawing liquid up through the condenser system 15. It will be appreciated that water entering through the bottom or water intake port 31 of the electrolysis intake chamber 30 will be much cooler than surface water 12. Thus refrigerant gas contained within the condenser will be cooled significantly by the passage of water through system 15. Weight 21 secures chamber 30.

The evaporator sub-system 18 is disposed in spaced apart relation with respect to the condenser, and it receives relatively warm water pumped downwardly into it via hose or conduit 60 and a pump 62. Pump 62 intakes relatively warm water via an inlet 64 and the pump is preferably supported and powered by boat 26 (or other supporting structure). Evaporator 66 preferably outputs water through its bottom or outlet portion 67. Liquid refrigerant in a separate chamber in the evaporator is boiled by the relatively warm water passing through. The resultant gassified refrigerant is then transmitted under pressure to the turbine sub-system 20.

Turbine sub-system 20 drives a generator 70 preferably secured to the support platform 26. Each of the turbines share a common axle 72 extending downwardly into the water from generator 70. A primary turbine 74 is driven by refrigerant gas pressure transmitted to it via conduit 76 extending from the evaporator. A tertiary turbine 78 is interconnected to the evaporator 66 via conduit 80 to exhaust contaminating water mixed with refrigerant, as will later be described. The outputs of turbines 74, 78 are combined at a junction 79 which communicates with condenser 46 via conduit 82. A return conduit 84 transmits refrigerant liquid to a secondary turbine 86, the liquid output of which is returned to the evaporator via conduit 88. Each of the conduits involved in the present invention may be rigid metal or plastic hose. To facilitate passage of liquid refrigerant downwardly through conduits 84, and 88 through turbine 86, it will be observed that turbine 86 is positioned at a depth intermediate the depth of evaporator 66 and condenser 46. In most embodiments of the present invention evaporator 66 will be disposed at a depth somewhat lower than condenser 46 as clearly illustrated in FIG. 1.

Importantly, the evaporator and condenser are disposed at depths wherein hydrostatic pressure (calculated through well known formulas) is sufficient to equalize or neutralize gas pressure. This effect permits the use of thinwalled construction; since gas pressure within evaporator 18, for example, is controlled by outside water pressure instead of by the strength of the evaporator chambers.

By way of example, the proper operating depths of the condenser and evaporator may be calculated with the use of basic formulas, once the refrigerant is selected and ocean temperature conditions are known. Vapor pressures may be located by reference to pages 3-45 of *The Chemical Engineers Handbook*, 5th Edition, McGraw Hill, 1973. Ocean operating temperature extremes vary between five to thirty degrees centigrade (273° to 303° Kelvin); pressure may vary between 1 atmosphere (at the surface) to several hundred atmospheres at lower depths (as a direct function of depth).

Thus, for the refrigerant chlorine, $P_v$ (atmospheres) = $(0.1976 \text{ atms}/°K)(T°K) - 51.01$ atms, where T is temperature of the chlorine, and $P_v$ is the vapor pressure. The working depth $L_m$ of the units is calculated as follows:

$$L_m = (P_v - 1)(10.07).$$

Applying the foregoing formulas the following example may be obtained:

TABLE 1

|  | Depth (mtrs) | $P_v$ (atms) | T (°K.) |
|---|---|---|---|
| Condenser | 35.51 | 4.526 | 281 |
| Evaporator | 63.34 | 7.292 | 295 |

The above assumes, of course, that the water pressure outside the evaporator and/or condenser will be the same as the internal gas pressure. Reference is further directed to NOAA Diving Manual, January 1975, Pages 1-1 to 1-4.

Figures 2, 3:
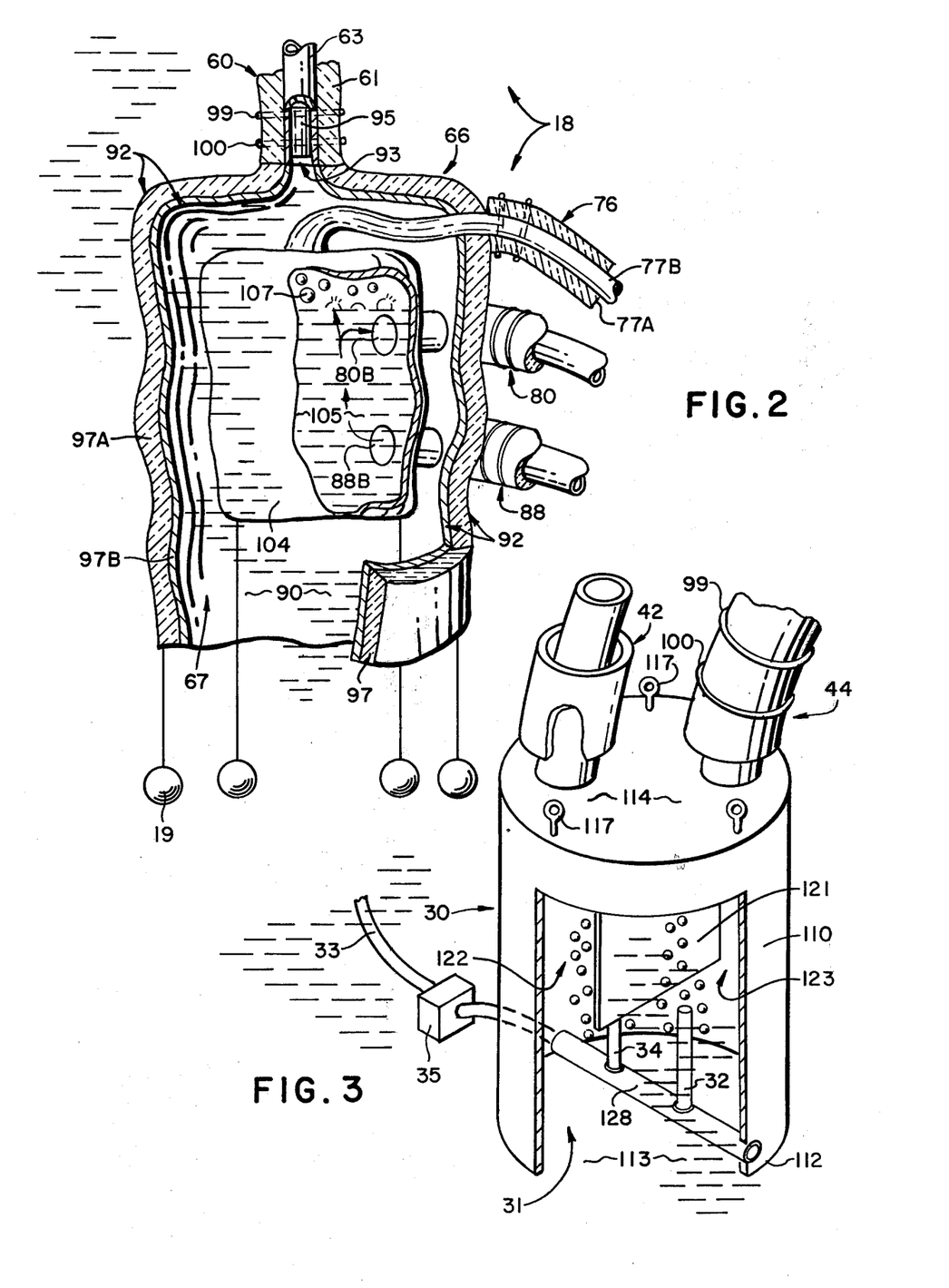
FIG. 2 is an enlarged, isometric view of the evaporator unit with parts thereof broken away or shown in section for clarity.
FIG. 3 is an enlarged, isometric view of the water intake and electrolysis chamber preferably employed, with parts thereof broken away or shown in section for clarity.

With reference now to FIG. 2, evaporator 66 is of thinwalled, deformable construction. As used herein the term "deformable" shall be taken to mean that the walls and structure of the evaporator or condenser are free to bend or conform to varying pressures or currents and are not constrained by the rigidity of metallic components. The bottom or water exhaust port 67 opens to a first internal chamber 90 which is defined by the periphery of a thinwalled, deformable, preferably canvas or plastic bag-shaped wall, generally designated by the reference numeral 92. The temperature within internal chamber 90 will substantially be maintained at or near the temperature of the surface water being pumped through the compartment via conduit 60.

Wall 92 comprises an outer insulative layer 97A which is disposed about the evaporator to prevent heat losses and an inner, plastic liner 97B. The input conduit 60 may include an outer sleeve 61 of similar insulative material to maintain the temperature of warm surface water being pumped therethrough. Conduit 60, which includes inner pipe 63 and insulative sheath 61, may be coupled to the evaporator by mating the evaporator first chamber input orifice 93 to the end portion of the conduit with the aid of a coupling sleeve 95 and a pair of conventional, high compression hose clamps 99, 100. It will be appreciated that all of the hose or conduit connections to the various evaporator or condenser couplings in this invention may be similarly formed.

A second interior chamber 104 normally filled with a refrigerant 105 is disposed substantially concentrically with respect to wall 92 within evaporator 66. The refrigerant employed will preferably be liquid chlorine, although ammonia and other refrigerants having a low boiling pressure may be utilized successfully. Chamber 104 is formed from deformable plastic. Gas output conduit 76 includes an outer insulative sheath 77A surrounding an internal hose 77B which communicates with the top of the refrigerant chamber 104. It will be observed that pressurized refrigerant gas 107 rises within chamber 104 and exits evaporator 66 via conduit 76. Liquid refrigerant is returned through the bottom of chamber 104 via a conduit 88 and an inlet port 88B. During operation a percentage of water will be mixed with the refrigerant, and water, which floats on liquid chlorine because of density difference, is pumped outwardly through the apparatus via an orifice 80B which communicates with conduit 80. The mixture of water and refrigerant reduces required evaporator surface area necessary for proper operation.

With reference now to FIGS. 1 and 3, the electrolysis or water intake chamber 30 preferably comprises a rigid metallic, generally cylindrical can 110 having a lowermost edge 112 adapted to be disposed upon or near the ocean bottom 113. The top 114 of the electrolysis chamber includes a plurality of spaced apart eyelets 117 adapted to be coupled to support wires 119 (FIG. 1) which terminate in a ring 120 coupled to a float 122 which maintains the unit in an operative generally vertical orientation in combination with weight 21.

High voltage electrical conduit 33 is coupled to rectifier 35. Direct current drives a pair of spaced apart electrolysis electrodes comprising anode 32 and cathode 34 which are disposed generally on opposite sides of a partition plate 121 which divides the interior of the chamber into substantially segregated or separate mineral ion regions 122, 123. The electrolysis electrodes 32, 34 extend vertically upwardly from a transversly positioned support member 128 extending between opposite sides of the chamber 30. It will be appreciated that minerals ionized within sub-compartments 122, 123 are drawn upwardly through conduits 42, 44 respectively. Metal ions are drawn through conduit 42, whereas gases such as chlorine, fluorine and oxygen are substantially confined to conduit 44.

Conduit pipes 42, 44 may be comprised of conventional fire hose or the like. A plurality of spaced-apart buoyancy members 130, 131 are positioned at spaced-apart locations along the length of each pipe. Tubular coupling members 134 are provided between the buoyancy members 130, 131 to allow a junction to be formed between conduits 42, 44 at varying depths, as illustrated in dashed lines in FIG. 1. Where mineral solutions originally aggregated within electrolysis chamber regions are rejoined at varying depths, re-combination of ionized elements may result in formation or concentration of a desired mineral salt or precipitate which will then be upwardly drawn through the mineral recovery system. Accordingly, the terminal end 136 of conduit 42 may be joined to couplings 134 of conduit 42, as desired at variable depths. A check valve system 140 (FIG. 5) is preferably employed to prevent backflow from pressure within conduits 44, 42. To this effect a thin blocking wall 143 is flexibly disposed within interior passageway 144 to occlude same when pressure within conduit 144 is greater than pressure within passage 139. Plugs 137 may be disposed within terminals 134 to block the admission of water. Segregation results from coupling conduit end 136 to coupling 153.

Buoyancy members 130, 131 form substantially identical, series inserted, sausage-like members (FIG. 4) having larger diameter outer shells 200. A region 202, which is filled with water, is formed between pipe subportion 204, and shell 200. Water within region 202 acts as a heat insulator. Pipe subportion 204 is of a diameter larger than the diameter of intermediate conduit pipe sections 42E, 44E. This construction lowers the velocity of upwardly rising solution. This tends to facilitate separation of gas from liquid. However gas is encouraged to again mix with water in the intermediate reduced diameter portions 44E, 42E.

Figures 4, 5:
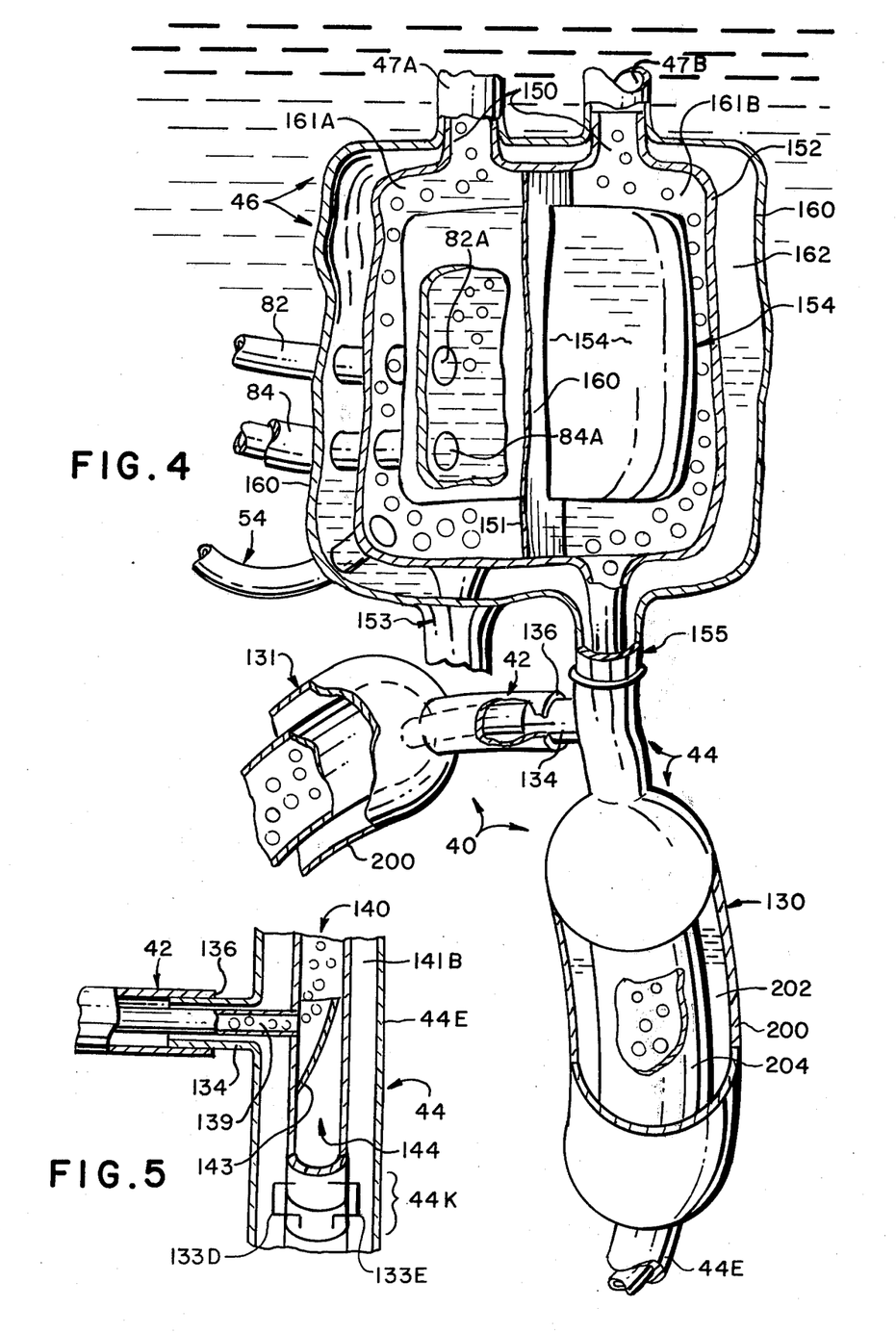
FIG. 4 is an enlarged, isometric view of the condenser unit and portions of the lower conduit system preferably employed by the present invention, with parts thereof broken away or shown in section for clarity.
FIG. 5 is an enlarged, sectional view of an optional conduit check valve system and accessory MHD and electrolysis cells; and, FIG. 6 is an enlarged, isometric view illustrating the mineral recovery sub-system.

The internal pressure within members 130, 131 is reduced by the expanded diameter volume. This minimizes structural deformation and avoids destruction of systems 42, 44 which must be in the order of thousands of meters in length. The intermediate pipe portions 42E, 44E are reinforced to handle their high internal pressures (resulting from their reduced volume). Due to the small relative length of sections 42E, 44E the higher cost of these sections does not approach the cost which would result from employment of rigid pipe throughout. Reinforcement is achieved in part by water jacket 141B. Thus with the structure suggested, useful uplifting work is extracted from gases (liberated within chamber 30) without cost prohibitive conduits.

As indicated in FIG. 5 pipe subsections 44K can be used to extract energy when a magnetic field is applied transverse to the length of the pipe. This MHD technique is thoroughly depicted in U.S. Pat. No. 3,549,914, issued Dec. 22, 1970, which is hereby incorporated by reference. Energy may be applied to electrodes 133D, 133E to promote chemical disassociation to control pressure and prevent destruction of the pipe through inertial effects of "water hammer" or the like.

Condenser 46 (FIG. 4) is formed from loosely deformable materials such as plastic, water-proof canvas or the like. A primary heat exchange chamber, generally designated by the numeral 150, is defined between a loose, bag-like enclosure 152 and an internally-disposed, generally concentrically positioned refrigerant sub-compartment 154. Relatively cool solution from the intake chamber 30 passes through region 150 to cool the refrigerant within compartment 154, being delivered thereto via conduit systems 42, 44. Region 150 is subdivided by partition wall 160 into regions 161A and 161B, to preserve segregation of solution entering the condenser via the different inputs 153, 155 (the corresponding outputs are numbered 47A, 47B respectively). An outermost enclosure 160 formed by a similar, deformable bag surrounds the apparatus to provide an insulative layer. It will be observed that conduits 82 and 84 respectively penetrate bag layers 160, 152 and terminate interiorly of the refrigerant sub-compartment 154. In this manner gas refrigerant enters through conduit 82 to the interior of refrigerant sub-compartment 154, whereupon subsequent cooling results in the condensation of liquid refrigerant which is recycled through conduit 84. The cooler liquid entering the condenser sub-system 15 via inputs 153, 155 is passed through the heat exchange sub-compartments 161A, 161B respectively in heat exchange relation around and in contact with refrigerant sub-compartment 154. It will be appreciated that mineral solutions originally segregated within sub-compartments 122, 123 of electrolysis chamber 30 thus are maintained in separate segregated fluid passageways as they rise to the surface for subsequent collection.

Figure 6:
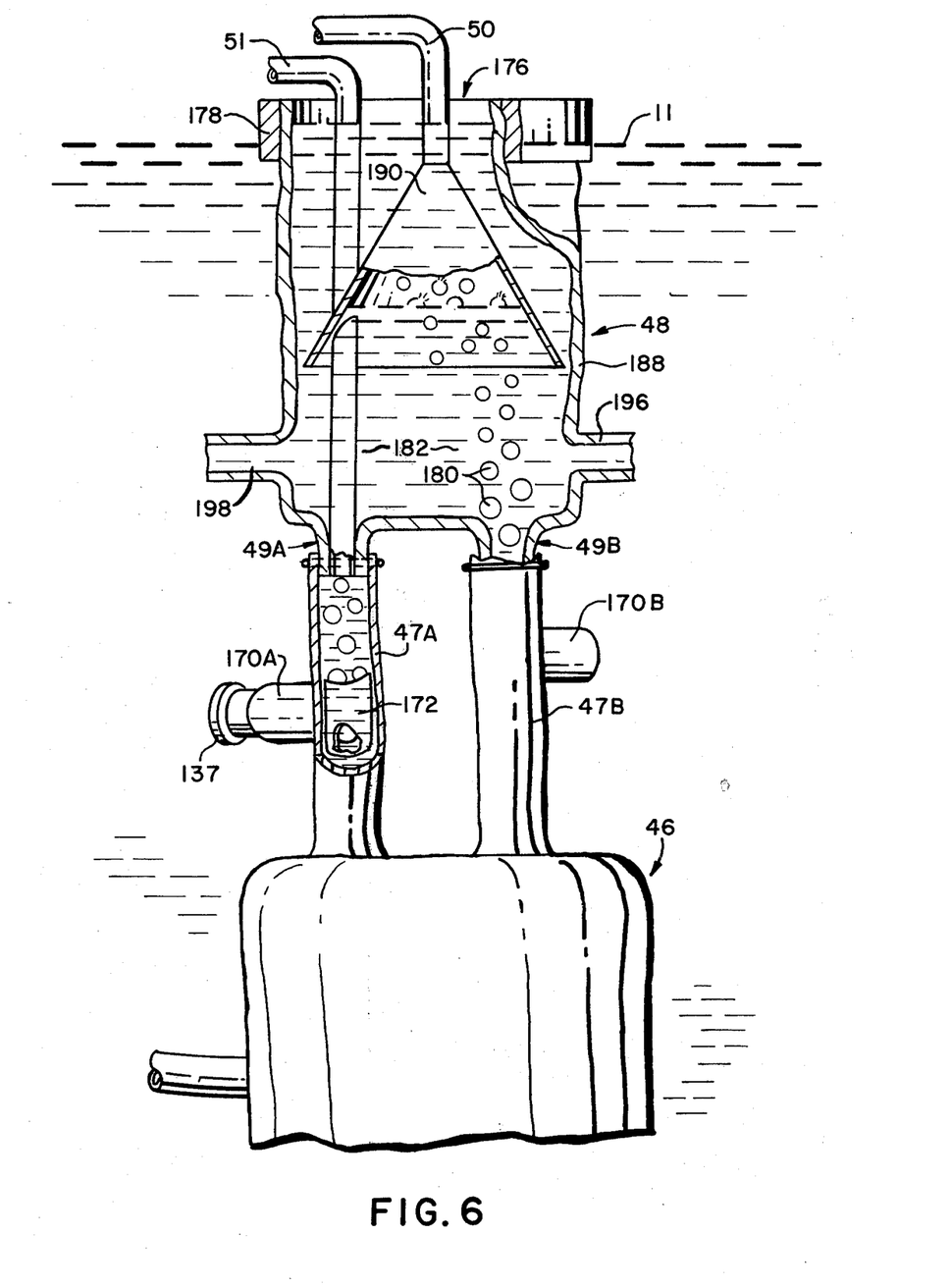

With reference now to FIG. 6, a dual passage settling tank 48 is interconnected to the condenser 46 via conduits 47A, 47B. As indicated earlier these conduits 47A, 47B communicate with heat exchange regions 161A, 161B. A variety of settling tanks can be employed for purposes of mineral recovery herein system 48 is preferable.

Couplings 170A, 170B extend transversely from conduits 47A, 47B respectively for recovery of minerals independently of the turbine system. The interconnection of conduits 42, 44 as discussed in conjunction with FIG. 1 supra will thus bypass condenser 46 entirely. It will be noted that a check valve assembly 172 (similar to that illustrated in FIG. 5) is optionally included within conduit 47A to prevent unwanted backflow. Plug 173 optionally protects coupling 170 when unused.

The chemical recovery system 48 comprises a substantially submerged settling tank 188 formed of deformable or semi-rigid material, and it terminates in lower bottom couplings 49A, 49B adapted to be coupled to conduits 47A, 47B respectively. The upper mouth 176 of the tank is surrounded by a circumferential flotation ring 178 which enables the apparatus to be floated upon the surface 11 of the ocean or body of water in which the apparatus is disposed. As various chemicals rise within the liquid 182 disposed within tank 188, gases 180 thus liberated will be confined within a generally funnel shaped, inverted enclosure 190 disposed within the recovery tank. In this fashion recovered gases may be obtained through conduit 50 leading from the funnel system. Alternate chemical products, such as manesium hydroxide, are pumped out of conduit 47A via conduit 51. Transverse conduits 196, 198 facilitate recovery of precipitates falling to the tank bottom.

The turbine system 20 interconnects the evaporator 66 with the condenser 46. To this effect it will be appreciated that gaseous refrigerant will be forced from the refrigerant chamber through conduit 76 driving turbine 74. Gaseous refrigerant will enter the refrigerant sub-compartment 154 within condenser 46 where it will be cooled and liquefied. Liquefaction of refrigerant will result in passage of liquid refrigerant downwardly through conduit 84, driving turbine 86 before returning into evaporator refrigerant chamber 104 (FIG. 2). Turbine 74 and 86 will thus be rotated by the recycling effect of refrigerant. However, turbine 78 will be driven by the other two turbines in order to transport "hot" water inadvertently mixed with refrigerant 105 within chamber 104 for cooling in the condenser unit. It will be appreciated that a refrigerant (preferably liquid chlorine) and water impurities will not mix, and the lighter density of water will cause it to rise to the top within chamber 104 for subsequent output though orifice 80B. By recirculating water in this fashion the heat exchange efficiency of the apparatus will be increased, such that actual surface area of the necessary deformable enclosures will be minimized, buth the equivalent surface area will be maximized.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A system for simultaneously generating energy and recovering minerals, the system comprising:
   an electrolysis chamber adapted to be disposed at the bottom of a body of water, the chamber including a pair of spaced-apart electrolysis electrodes and a water inlet;
   means for electrically energizing said electrodes whereby to facilitate electrolysis within said chamber;
   a deformable condenser in fluid flow communication with said electrolysis chamber disposed at an intermediate depth above said chamber and including a first internal sub-compartment having fluid input means and fluid output means and a second internal sub-compartment normally filled with a refrigerant and having fluid input means and fluid output means said first and second sub-compartments disposed in heat exchange relation within said condenser for cooling said refrigerant;
   conduit means interconnecting said electrolysis chamber with said condenser, said last mentioned means coupled to said first internal condenser sub-compartment input means;
   chemical recovery means disposed at the surface of said body of water for extracting minerals from solution rising upwardly from said electrolysis chamber through said system, said recovery means in fluid flow communication with said first internal condenser sub-compartment fluid output means;
   pump means for lifting solution upwardly through said electrolysis chamber and said condenser to said chemical recovery means;
   a deformable evaporator including a first internal chamber and a second internal chamber disposed in heat exchange relation, said second chamber normally filled with a refrigerant and having at least one input and at least one output;
   means for forcing relatively warm surface water through said evaporator first internal chamber whereby to boil said refrigerant within said evaporator second internal chamber;
   primary turbine means for generating energy from refrigerant pressure, said turbine means comprising an input coupled to an evaporator second chamber output and an output coupled to said condenser second internal sub-compartment input means whereby refrigerant flows between said evaporator and said condenser; and,
   return path means coupled between said condenser second internal sub-compartment output means and an evaporator second internal chamber input for recycling refrigerant between said evaporator and said condenser.

2. The system as defined in claim 1 wherein said condenser and said evaporator are each located at a depth wherein hydrostatic pressure is substantially equal to their internal refrigerant pressure.

3. The system as defined in claim 2 wherein:
   said electrolysis chamber includes means disposed between said electrodes whereby to substantially segregate chemical products of electrolysis into two separate regions;
   said first internal sub-compartment of said condenser is divided into separate mineral solution passageways;
   said conduit means comprises two separate hoses interconnecting each of said electrolysis chamber regions with said separate condenser sub-compartment mineral passageways; and,
   said chemical recovery means is interconnected to said first internal condenser sub-compartment by two separate hoses respectively coupled to said separate passageways for minimizing commingling of recovered minerals.

4. The system as defined in claim 3 wherein said conduit means separate hoses comprise a plurality of high pressure hose junction points separating a plurality of increased diameter, spaced-apart buoyancy members.

5. The system as defined in claim 1 wherein said first and second evaporator chambers are formed from flexible, deformable material, said second chamber positioned substantially at the center of said evaporator.

6. The system as defined in claim 5 wherein said first chamber comprises a bag loosely surrounding said second chamber and having an open bottom for permitting escape of water pumped down into said evaporator.

7. The system as defined in claim 6 wherein said condenser first and second internal sub-compartments are formed from flexible, deformable material, and said second sub-compartment is positioned substantially concentrically within said first subcompartment.

8. The system as defined in claim 7 wherein said condenser includes exterior wall means formed from deformable material and positioned in surrounding relation with respect to said first sub-compartment for forming an insulative sub-compartment about said condenser.

9. The system as defined in claim 2 wherein said condenser first and second internal sub-compartments are formed from flexible, deformable material, and said second sub-compartment is positioned substantially concentrically within said first sub-compartment.

10. The system as defined in claim 9 wherein said condenser includes exterior wall means formed from deformable material and positioned in surrounding relation with respect to said first sub-compartment for forming an insulative sub-compartment about said condenser.

11. The system as defined in claim 2 wherein said return path means includes second turbine means for generating energy in response to passage of liquid refrigerant therethrough.

12. The system as defined in claim 11 wherein said system includes tertiary turbine means coupled between an evaporator second chamber output and the output of said primary turbine means for recycling heat spreading water residue mixed with said refrigerant between said evaporator and said condenser to promote thermal efficiency, said tertiary turbine means driven by said first and second turbine means.

13. The system as defined in claim 2 including means associated with said conduit means for generating energy in response to the flow of chemical solution therethrough.

14. A system for producing energy comprising:

a cold water intake chamber adapted to be disposed at the ocean bottom for intaking cold water into said system;

a deformable condenser in fluid flow communication with said chamber disposed at an intermediate depth above said chamber and including first internal sub-compartment having fluid input means and fluid output means and second internal sub-compartment normally filled with refrigerant and having fluid input means and fluid output means, said first and second sub-compartments disposed in heat exchange relation within said condenser for cooling said refrigerant;

conduit means interconnecting said intake chamber with said condenser, said conduit means coupled to said first internal condenser sub-compartment input means;

pump means for drawing cold water upwardly through said intake chamber and said condenser;

a deformable evaporator including a first internal chamber and a second internal chamber disposed in heat exchange relation, said second internal chamber normally filled with a refrigerant and having at least one input and at least one output;

means for forcing relatively warm surface water through said evaporator first internal chamber whereby to boil said refrigerant within said second evaporator internal chamber;

primary turbine means for generating energy from refrigerant pressure, said turbine means comprising an input coupled to an evaporator second chamber output and an output coupled to said condenser second internal subcompartment input means whereby refrigerant flows between said evaporator and said condenser; and, return path means coupled between said condenser second internal sub-compartment output means and an evaporator second internal chamber input for recycling refrigerant between said evaporator and said condenser.

15. The system as defined in claim 14 wherein said condenser and said evaporator are each located at a depth wherein hydrostatic pressure is substantially equal to their internal refrigerant pressure.

16. The system as defined in claim 14 wherein said first and second evaporator chambers are formed from flexible, deformable material, said second chamber positioned substantially at the center of said evaporator.

17. The system as defined in claim 16 wherein said first chamber comprises a bag loosely surrounding said second chamber and having an open bottom for permitting escape of water pumped down into said evaporator.

18. The system as defined in claim 17 wherein said condenser first and second internal sub-compartments are formed from flexible, deformable material, and said second sub-compartment is positioned substantially concentrically within said first sub-compartment.

19. The system as defined in claim 18 wherein said condenser includes exterior wall means formed from deformable material and positioned in surrounding relation with respect to said first sub-compartment for forming an insulative sub-compartment about said condenser.

20. The system as defined in claim 15 wherein said condenser first and second internal sub-compartments are formed from flexible, deformable material, and said second sub-compartment is positioned substantially concentrically within said first sub-compartment.

21. The system as defined in claim 19 wherein said condenser includes exterior wall means formed from deformable material and positioned in surrounding relation with respect to said first sub-compartment for forming an insulative sub-compartment about said condenser.

22. The system as defined in claim 15 wherein said return path means includes second turbine means for generating energy in response to passage of liquid refrigerant therethrough.

23. The system as defined in claim 22 wherein said system includes tertiary turbine means coupled between an evaporator second chamber output and the output of said primary turbine means for recycling heat spreading water residue mixed with said refrigerant between said evaporator and said condenser to promote thermal efficiency, said tertiary turbine means driven by said first and second turbine means.

24. The system as defined in claim 15 including means associated with said conduit means for generating energy in response to the flow of chemical solution therethrough.

25. A method for simultaneously generating energy and recovering minerals from a large body of water, the method comprising the steps of:
ionizing mineral salts in an electrolysis chamber adapted to be disposed at the bottom of said body of water;
pumping the output of the electrolysis chamber to a deformable condenser disposed at an intermediate depth above said chamber for cooling a refrigerant disposed in a separate sub-compartment therewithin;
recovering minerals from said body of water after pumping ionized solution through said condenser to the surface;
boiling refrigerant in a submerged deformable evaporator by pumping relatively warm surface water downwardly therethrough;
generating energy from refrigerant pressure by passing refrigerant gas through a turbine coupled between the evaporator and the condenser; and,
returning liquid refrigerant from said condenser to said evaporator whereby to recycle said refrigerant.

26. The method as defined in claim 25 including the steps of locating said condenser and said evaporator at a depth wherein hydrostatic pressure is substantially equal to their internal refrigerant pressure.

27. The method as defined in claim 26 including the step of segregating chemical products of electrolysis into two separated passageways through said electrolysis chamber and said condenser.

28. The method as defined in claim 27 including the steps of interconnecting said condenser with said electrolysis chamber with separate hoses having a plurality of spaced-apart high pressure junctions and a plurality of increased diameter spaced-apart buoyancy members whereby to strengthen said hoses.

29. The method as defined in claim 26 including the step of forming separate evaporator chambers from flexible, deformable material and positioning the refrigerant chamber substantially at the center of said evaporator.

30. The method as defined in claim 29 including the step of surrounding the refrigerant chamber with a bag having an open bottom for permitting escape of water pumped down into said evaporator.

31. The method as defined in claim 26 including the step of forming said condenser from flexible, deformable material and positioning a refrigerant sub-compartment substantially concentrically within the condenser.

32. The method as defined in claim 31 including the step of providing said condenser with an exterior wall formed from deformable material for forming an insulative sub-compartment about said condenser.

33. The method as defined in claim 30 including the step of forming said condenser from flexible, deformable material and positioning a refrigerant sub-compartment substantially concentrically within the condenser.

34. The method as defined in claim 33 including the step of providing said condenser with an exterior wall formed from deformable material for forming an insulative sub-compartment about said condenser.

35. The method as defined in claim 26 including the step of generating energy in response to passage of liquid refrigerant returning from said condenser to said evaporator.

36. The method as defined in claim 35 including the step of recycling water residue mixed with refrigerant between said evaporator and said condenser with a third turbine driven by said first and second turbine means to promote thermal heat exchange efficiency.

37. A method for generating energy comprising the steps of:
pumping cold water from the bottom of a large body of water through a deformable condenser disposed at an intermediate depth above the bottom of said body of water for cooling a refrigerant disposed in a separate sub-compartment therewithin;
boiling refrigerant in a submerged deformable evaporator by pumping relatively warm surface water downwardly therethrough;
generating energy from refrigerant pressure by passing refrigerant gas through a turbine coupled between the evaporator and the condenser; and,
returning liquid refrigerant from said condenser to said evaporator whereby to recycle said refrigerant.

38. The method as defined in claim 37 including the steps of locating said condenser and said evaporator at a depth wherein hydrostatic pressure is substantially equal to their internal refrigerant pressure.

39. The method as defined in claim 38 including the step of segregating chemical products of electrolysis into two separated passageways through said electrolysis chamber and said condenser to prevent mineral recombination.

40. The method as defined in claim 39 including the steps of interconnecting said condenser with said electrolysis chamber with separate hoses having a plurality of spaced-apart high pressure junctions and a plurality of increased diameter spaced-apart buoyancy members whereby to strengthen said hoses.

41. The method as defined in claim 38 including the step of forming separate evaporator chambers from flexible, deformable material and positioning the refrigerant chamber substantially at the center of said evaporator.

42. The method as defined in claim 41 including the step of forming separate evaporator chambers from flexible, deformable material and positioning the refrigerant chamber substantially at the center of said evaporator.

43. The method as defined in claim 38 including the step of forming said condenser from flexible, deformable material and positioning a refrigerant sub-compartment substantially concentrically within the condenser.

44. The method as defined in claim 43 including the step of providing said condenser with an exterior wall formed from deformable material for forming an insulative sub-compartment about said condenser.

45. The method as defined in claim 42 including the step of forming said condenser from flexible, deformable material and positioning a refrigerant sub-compartment substantially concentrically within the condenser.

46. The method as defined in claim 45 including the step of providing said condenser with an exterior wall formed from deformable material for forming an insulative sub-compartment about said condenser.

47. The method as defined in claim 38 including the step of generating energy in response to passage of liquid refrigerant returning from said condenser to said evaporator.

48. The method as defined in claim 47 including the step of recycling heat spreading residue mixed with refrigerant between said evaporator and said condenser with a tertiary turbine driven by said first and second turbine means to promote thermal heat exchange efficiency.

* * * * *